Aug. 29, 1967  J. R. NELSON, JR., ET AL  3,337,908
METHOD AND APPARATUS FOR FLOCKING
Filed May 7, 1965  4 Sheets-Sheet 1
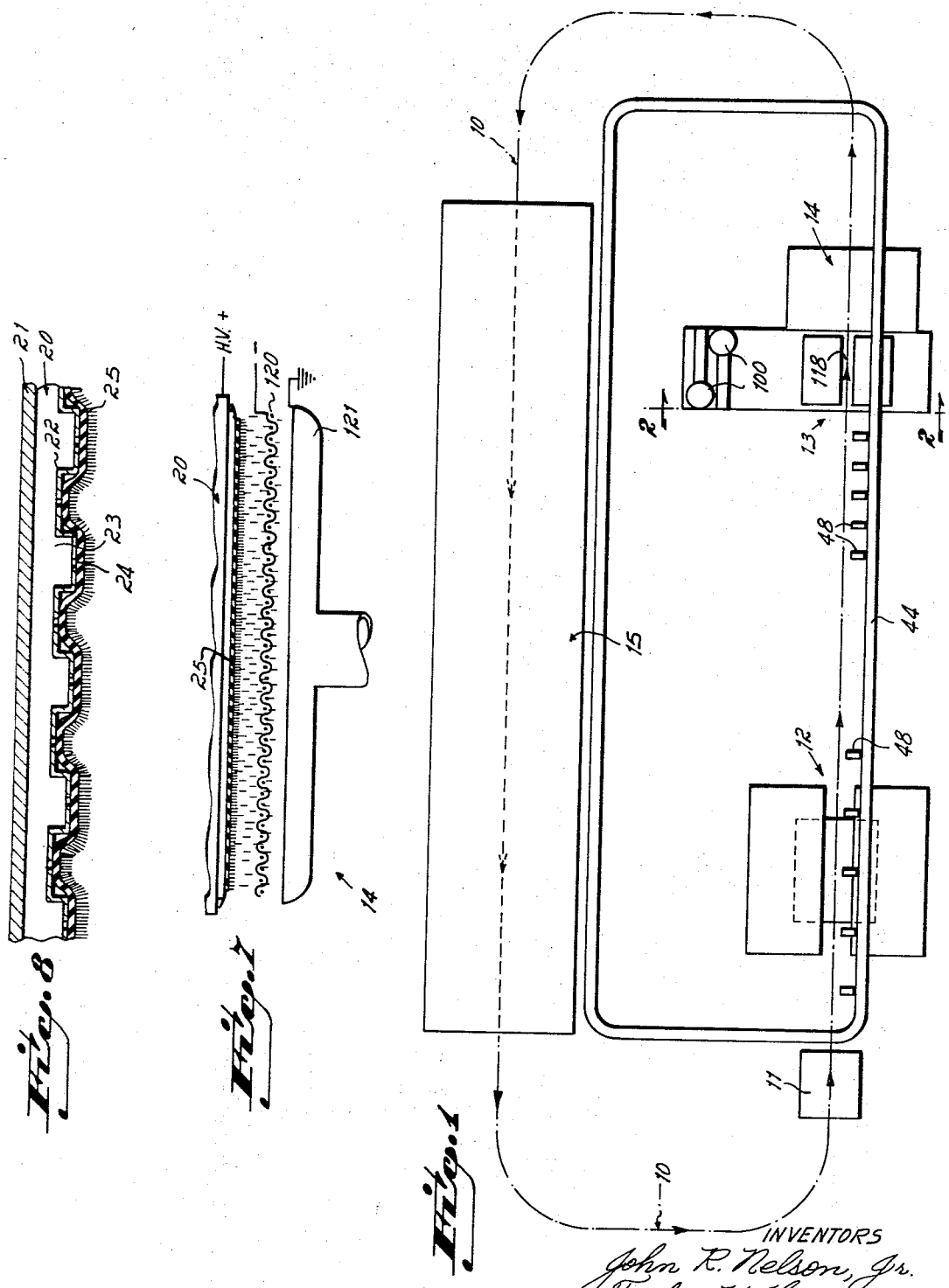
INVENTORS
John R. Nelson, Jr.
Tyler K. Hayes
BY Wood, Herron & Evans
ATTORNEYS

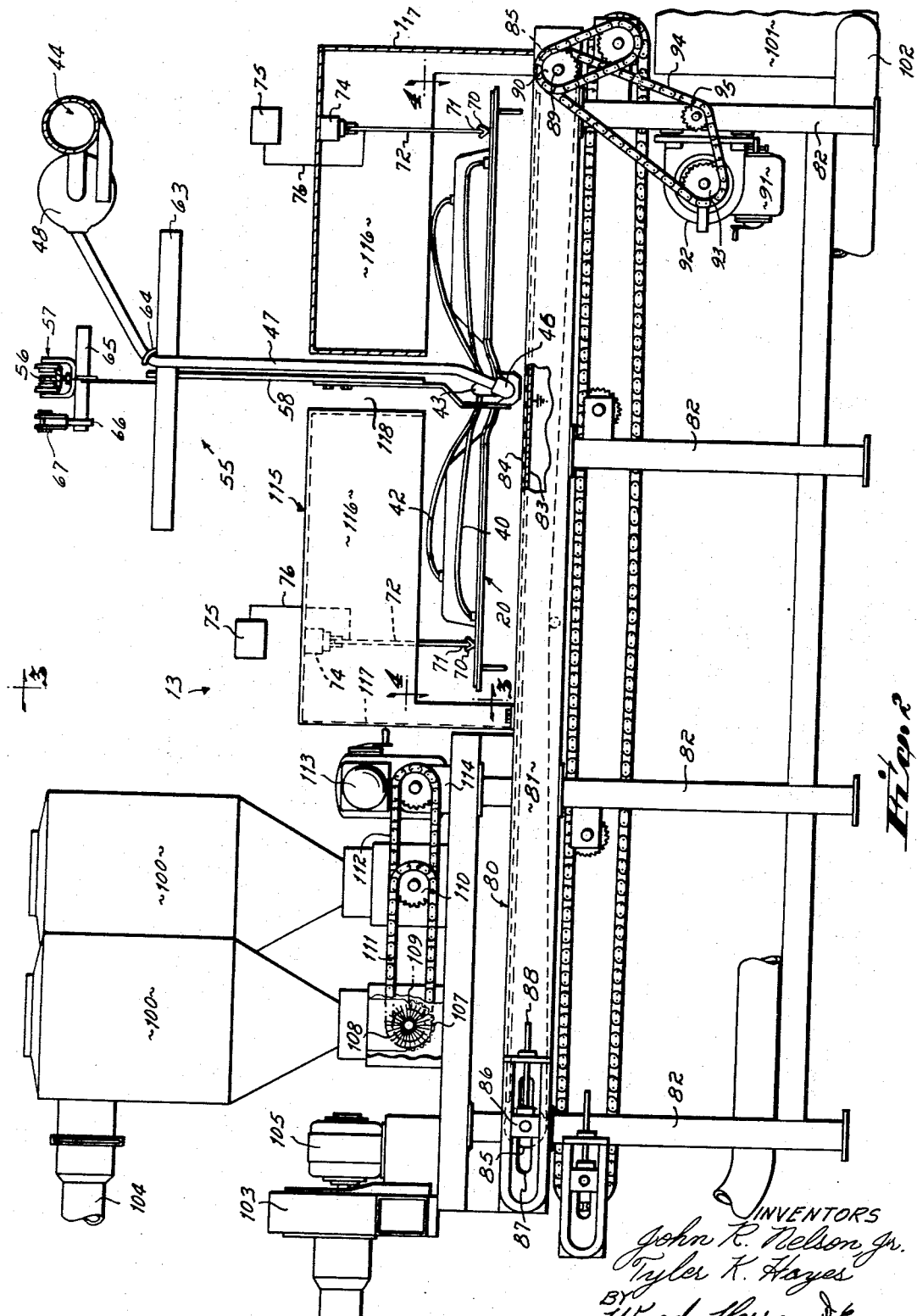

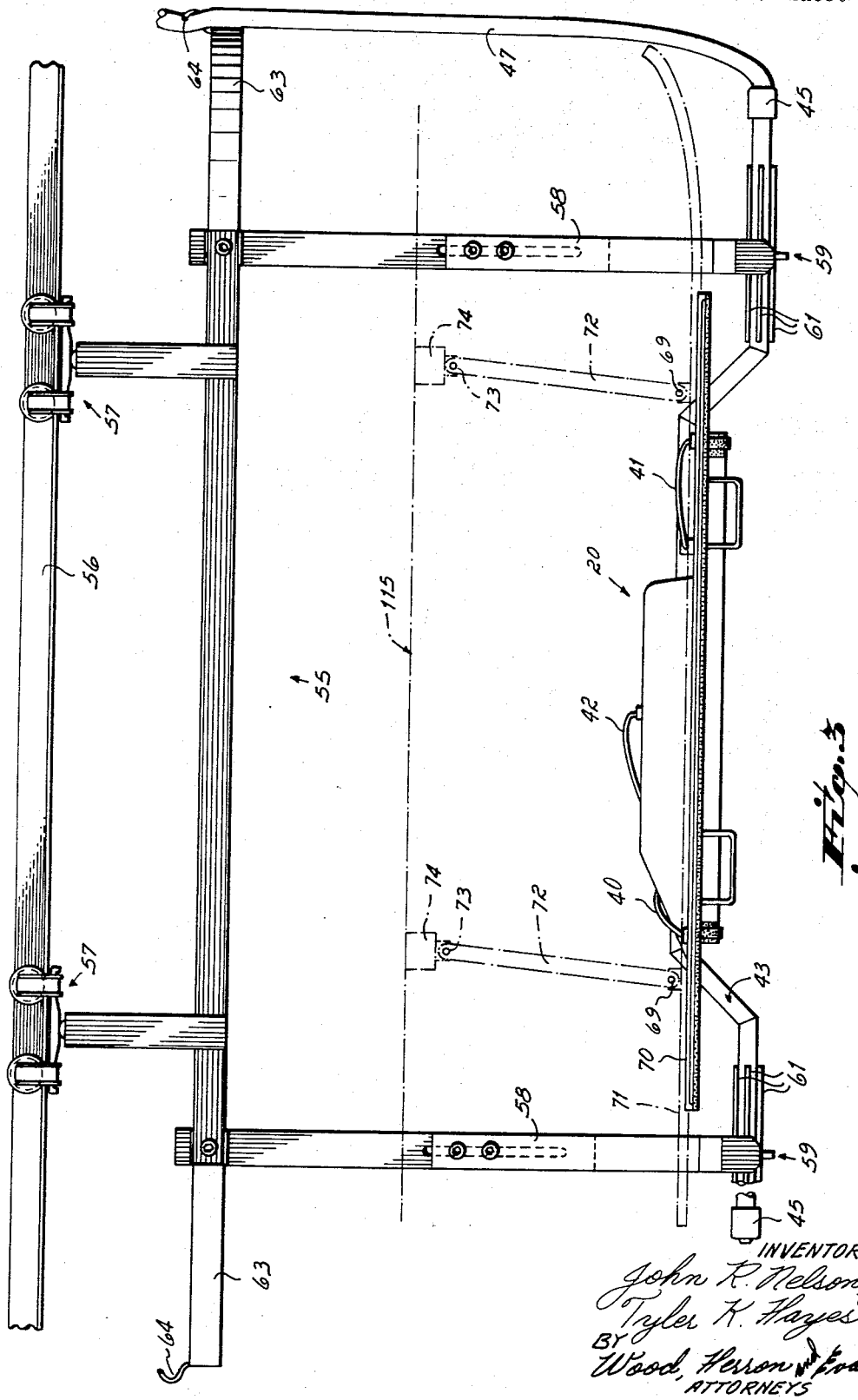

Aug. 29, 1967
J. R. NELSON, JR., ETAL
3,337,908
METHOD AND APPARATUS FOR FLOCKING
Filed May 7, 1965
4 Sheets-Sheet 4
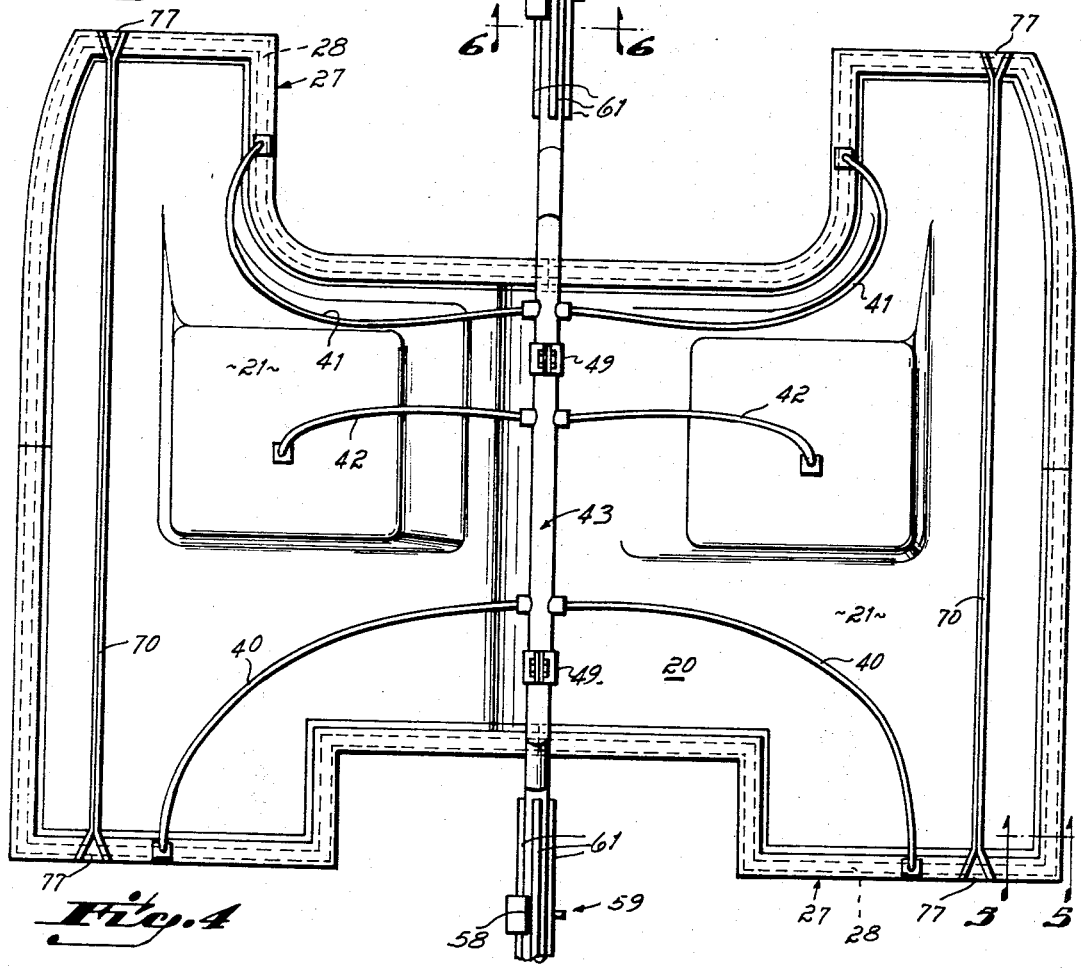
INVENTORS
John R. Nelson, Jr.
Tyler K. Hayes
BY
Wood, Herron & Evans
ATTORNEYS United States Patent Office 3,337,908
Patented Aug. 29, 1967

3,337,908
METHOD AND APPARATUS FOR FLOCKING
John R. Nelson, Jr., and Tyler K. Hayes, Mentor, Ohio, assignors to The Eagle-Picher Company, Cincinnati, Ohio, a corporation of Ohio
Filed May 7, 1965, Ser. No. 453,937
8 Claims. (Cl. 18—4)

ABSTRACT OF THE DISCLOSURE

Apparatus for flocking a sheet in which the sheet is mounted face down on a conductive support, the space between the support and the sheet being evacuated to hold the sheet against gravity and means for passing the sheet over a supply of flock fibers while creating an electrostatic field between said conductive support and the supply of flock fibers.

---

This invention relates to a method and apparatus for flocking car mats and other similar discrete sheets.

There are presently a number of ways to make an automotive floor mat. The different processes have been developed in an effort to cope with the problems attending the extreme contours of an automobile floor and in an effort to provide an attractive floor covering which is inexpensive to manufacture. The plain rubber floor mat whose surface may be provided with a molded configuration is, of course, well known. Another floor covering which is in common use is a carpet which has been cut and sewed so as to fit properly to the contour of the automobile floor. Still another form of floor covering comprises a composite of the rubber floor mat and a sheet of carpeting wherein the floor mat is molded separately and thereafter the carpeting is adhesively secured to the floor mat. These floor coverings have proved to be reasonably satisfactory but great improvement over them could be introduced by the provision of a flocked contoured floor mat.

For example, the flocking of a molded floor mat admits of a wide variety of texturing and providing of multi-colored patterns whereby much more attractive floor coverings could be provided than are presently possible through the use of known processes for manufacturing floor mats. Further, it is possible to impart to a floor covering, through the flocking process, a wearing quality far superior to that of conventional carpeting. Thus if it is economically practical to manufacture a flocked contoured floor mat for automobiles, such manufacture would be very desirable to the automotive industry.

Heretofore the flocking of large sheets has been confined almost entirely to the flocking of continuous webs which pass over or under a supply of flock fibers. These webs are neither cut to the proper configuration nor are they molded to conform to the surface of the automobile floor and thus are not particularly useful in the manufacture of an automotive floor covering. The flocking of a continuous web is not a particularly difficult operation for the apparatus by which the web is coated with an adhesive and passed between electrodes creating an electrostatic field are of reasonably simple design. Very little is required in the handling of the material and the structure admits of continuous production methods. This is not true for the flocking of contoured floor mats. These mats are heavy, awkward to handle and the problem of subjecting them to flock fibers in a substantially uniform electrostatic field has defied solution until the advent of the present invention.

An objective of the present invention has been to provide apparatus for the flocking of discrete contoured sheets, the apparatus admitting of continuous conveyorized production methods through which the manufacture of the flocked sheets can be performed economically. To this end, the invention provides for the mounting of a large contoured sheet on a support having substantially the same contour as the surface to be covered by the mat, e.g. automobile floor; and applying a vacuum to the support to hold the sheet against the pull of gravity on the support. Further, the support is electrically conductive and provision is made for the passing of the support over a supply of flock fibers while creating an electrostatic field between the support and a plate located below the flock fibers.

As another feature of the invention provision is made for the mounting of the support on trunnions which permit the rotation of the support about a horizontal axis thereby permitting a number of operations to be performed on the sheet mounted on the support, the operations requiring the sheet to be held in differing angular positions.

Another objective of the invention has been to provide apparatus for flocking discrete sheets, the apparatus including a conveyor system and sequentially located stations for applying an adhesive to the articles, for flocking the articles, for cleaning the articles of loose flock fibers and for setting the adhesive. The apparatus includes provision for the automatic application of a high voltage to the article support as it approaches introduction into the flocking station.

In one form of the invention, a sheet of elastomeric material, rubber having been shown for the purpose of illustration, is molded and cured in conventional equipment to provide the sheet with the desired contour and to impress in the surface of the sheet the desired texture. As indicated, the sheet may be rubber, or it may be a thermoplastic material such as polyvinyl chloride. Thereafter, the sheet is flocked, utilizing the apparatus of the present invention, the flock fibers being deposited upon the textured surface of the sheet. Through this process it is possible to provide a sheet whose flocked surface has a very attractive and sharply defined texture. Where that sharp texture definition is not required, an alternative and more economical embodiment of the invention may be employed. In the alternative embodiment of the invention, an uncured sheet is mounted on a contoured buck whose surface has a coarse texture. The space between the sheet and buck is evacuated to force the sheet against the textured surface and to cause the texture to appear in the opposite exposed surface of the sheet. An adhesive is applied to that exposed surface and flock deposited in accordance with the present invention. While the vacuum is still applied, the sheet is cured in an oven under conditions which will effect the simultaneous curing of the sheet and setting of the adhesive.

A "buck" as used in this description refers to a conductive support having means to evacuate the air from one surface to provide support for a sheet which is to be flocked. The support is used as one electrode during the flocking process. The support may be used as a form of a vacuum mold for curing the flocked sheet.

These and other objectives of the invention will become more readily apparent from the following detailed description taken in conjunction with the accompanying drawings in which:

FIG. 1 is a diagrammatic plan view of the apparatus of the invention,

FIG. 2 is an elevational view of the flocking station taken along lines 2—2 of FIG. 1, FIG. 3 is a cross sectional view taken along lines 3—3 of FIG. 2, FIG. 4 is a plan view of the support for the sheets to be flocked taken in the direction of the lines 4—4 of FIG. 2, FIG. 5 is a cross sectional view taken along lines 5—5 of FIG. 4, FIG. 6 is a cross sectional view taken along lines 6—6 of FIG. 4, FIG. 7 is a diagrammatic elevational view, partly in sections, illustrating electrostatic cleaning apparatus, and FIG. 8 is a fragmentary cross sectional view of a sheet and support therefor illustrating an alternative form of the invention.

As illustrated in FIG. 1, the apparatus includes an endless conveyor indicated by the broken line 10, the conveyor being adapted to carry the sheets from a loading station 11 through an adhesive applying station 12, a flocking station 13, a cleaning station 14 and a curing oven 15. A vacuum system whose function will be described below is indicated at 16.

At the loading station, the mats are mounted on a support, which is hereinafter referred to as a buck, 20 which is illustrated in FIGS. 2–6. The buck is constituted by a metallic upper plate 21 and a metallic foraminous lower plate 22, the plates being spaced apart to provide a space 23 between them which can be evacuated for the purposes described below. The lower plate 22 is contoured to substantially the same configuration as the surface (a car floor, for example) to which the sheet is to be applied and is provided over its entire surface with holes 24 by which the vacuum in the space 23 can be communicated to a sheet 25 mounted on the plate 22.

The plates 21 and 22 are joined around their peripheral edges to a sealing rim or vacuum channel 27 formed by four independent sections, each sealed at its ends. The sealing rim 27 is hollow inside as indicated at 28 to provide a header to which vacuum is applied. The surface of the rim which faces the articles to be flocked is provided with a series of spaced holes 29 which are, for example, 1/16 in diameter and are located on one inch centers around the perimeter of the support.

The sealing rim has a dovetail groove 30 in which a rubber seal 31 is mounted, the sealing having at its base 32 a dovetail configuration matching that of the groove 30. The seal has holes 33 spaced on one inch centers along its length, the holes being aligned with the holes 29 in the sealing rim. The seal has laterally projecting flanges 34 and 35 extending along its length for engagement with the surface of the article 25 which is to be flocked.

The sealing rim is connected to a source of vacuum by a pair of hoses 40 connected to the sealing rim 27 along one edge of the support and a pair of hoses 41 which are connected to the sealing rim along the opposite edge of the support. Similarly, the space 23 between the plates 21 and 22 is connected to the vacuum source by hoses 42. All hoses are connected to a tubular trunnion 43 which serves as a header by which the hoses are connected to a source of vacuum indicated at 44 in FIGS. 1 and 2. The trunnion 43 has valved fittings 45 at each end which are adapted to be connected to mating fittings 46 (FIG. 2) the fittings 46 being connected to flexible hoses 47 which are normally coiled in housing 48 and are connected at their opposite ends to the vacuum source 44. The fittings 45 and 46 are of the type having valves which are opened when the fittings are engaged but which automatically close when the fittings are disengaged.

The tubular trunnion 43 is fixed to its buck 20 by clamps 49 and provides the means by which the buck 20 is mounted in the conveyor system. The buck 20 is supported in the conveyor system in its traverse through the apparatus by carriers 55 which engage the trunnion at each of its ends. The carriers are suspended on an inverted T-beam 56 by trolleys 57. An arm 58 is fixed to the trolley 57 and has a cradle 59 at its lower end. The cradle has a V-shaped surface 60 which receives the tubular trunnion bar 43.

At the area of engagement of the trunnion 43 with the cradle 59, the trunnion is provided with four rods 61 which are spaced 90° apart around the circumference of the trunnion. As viewed in FIG. 6, the rods 61 cooperate with the V-shaped surface 60 of the cradle 59 to fix the angular position of the trunnion and hence the angular position of the buck 20 in one of four angular positions. Thus the buck may be held in a vertical attitude during the application of adhesive, for example as by spraying. Before going into the flocking apparatus, the buck is rotated through 90° and is held in a perfectly horizontal position with the sheet facing downwardly. After cleaning, the buck may be rotated through 180° and held in a horizontal position with its flocked side up during curing.

Each carrier 55 is provided with a bumper 63. When a pair of carriers is supporting a buck as viewed in FIG. 3, the bumpers 63 project longitudinally beyond the bucks and in fact beyond the trunnion bars 43 thereby eliminating any possibility of damage through accidental engagement of adjoining assemblies of carriers and bucks. As shown in FIG. 2, each bumper is provided with a hook 64 by which a length of hose 47 can be captured and held by the bumper as the carrier moves the buck through the several stages of the apparatus.

Each carrier 55 has a pusher bar 65 fixed at its upper end and projecting transversely of the trolley. The pusher bar 65 is engageable by a lug 66 depending from a drive chain 67 by which the carriers are propelled along the conveyor system.

As best illustrated in FIGS. 3 and 4, each buck is provided with a pair of longitudinally extending V-shaped rails 70 which are flared at their ends as indicated at 77. The channels 70 are connected electrically to the metallic plate 22 as well as the metallic sealing rim 27 and function as commutator rails by which the buck is charged to create the electrostatic field as the buck moves through the flocking apparatus. Each rail is engaged by a commutator shoe 71 suspended by a pair of conductive rods 72 which are pivoted at their lower ends 69 to the shoe 71 and at their upper ends to an insulated mounting 74. The rods 72 are slightly longer than required for the shoe 71 to reach the rails 70. As shown in broken lines at FIG. 3, each shoe is suspended at two points along its length so that a parallelogram is formed as the buck 20 passes beneath the shoe thereby providing assurance of proper engagement. As diagrammatically shown, the rods 72 are connected to a high voltage source 75 by conductors 76. Since practically no current flows during the flocking operation, the contact of the commutator shoe 71 with the rails 70 needs to be only a light rubbing contact in order to raise the buck to the high voltage level required for flocking, that is up to generally 50,000 volts or above.

The flocking apparatus, shown in FIG. 2, is mounted on a base 80 which includes a frame constituted by a pair of transversely spaced channels 81 supported on legs 82. A flat plate 83 extends across the space between the channel members 81 and is fixed to the channel members to provide a support for a conveyor belt 84 and to provide the electrode opposed to the buck 20. The belt 84 passes about rollers 85 at each end of the frame. The roller at the left end of the frame as viewed in FIG. 2 is an idler roller which is mounted in a bearing block 86, the bearing block being slidable in a slot 87 and connected to an adjusting screw 88 to form a belt tensioner.

The roller 85 at the right end of the frame is mounted on a shaft 89 which is fixed to a drive sprocket 90. The drive sprocket 90 is driven by a motor 91 which is connected through a gear box 92 to a sprocket 93. A chain 94 passing around the sprockets 93 and an idler sprocket 95 connects the sprocket 93 to the sprocket 90 to drive the conveyor roller.

The flock fibers are sifted onto the belt 84 at the left end of the apparatus by a pair of feeders 100. The belt 84 carries the flock toward the right hand end of the apparatus underneath the bucks 20 which pass over the belt. The excess flock which is not deposited on the sheet passes over the end of the belt and into a hopper 101. The flock deposited into the hopper 101 is picked up pneumatically by a conduit 102 and conveyed to an impeller 103 which is connected to a conduit 104 at the high pressure side of the impeller 103. The impeller 103 is driven by a motor 105.

Means, not shown, are provided for introducing a new supply of flock into the conduit 102. That means is conventional and may, for example, include a hopper having an auger feed for driving flock fibers from the hopper into the conduit 102 through which the fibers are pneumatically conveyed to the feeders 100.

The feeders 100 discharge into a semi-cylindrical screen 107 engaged by a helical brush 108. The brushes associated with each feeder are rotated by sprockets 109 and 110. The sprocket 109 is driven by a chain 111 from the sprocket 110. The sprocket 110 is driven from a sprocket located behind it as viewed in FIG. 2 by a chain 112 which is driven by a motor 113 through a gear box 114. One of the helical brushes is a left-hand feed and the other helical brush is a right-hand feed. The brushes extend across the belt 84 but receive their supply of flock at opposite sides of the belt. The brush feeds are so oriented that they receive the flock and distribute it substantially uniformly across the belt 84.

A hood structure 115 is mounted over the conveyor belt 84 at the area through which the bucks 20 pass during the actual flocking operation. The hood structure is constituted by a pair of cantilevered hoods 116 having dowwardly extending side walls 117 by which they are mounted to the frame channels 81. The respective hoods 116 are spaced apart to leave a gap 118 through which the carrier 55 and hose 47 may pass during the flocking operation.

After flocking, the buck, while charged to a high potential, moves into the cleaning station. As the form moves out of the flocking apparatus, it moves over a grid 120 which has a charge of opposite polarity to that of the buck. Below the grid is a vacuum cleaner head 121 connected at ground potential. The grid 120 is, for example, of a chicken wire mesh with very large openings through which flock may readily pass. The loose flock fibers remaining on the article attached to the buck 20 have picked up the charge of the buck. As they pass over the oppositely charged grid, they are attracted toward the grid. Because the grid has large openings, they will pass through the grid toward the vacuum head 121 which is connected at ground potential and will be recirculated into the fiber supply system. After having electrostatically removed most of the unadhered fibers from the article, the article may be subjected to conventional vacuuming to remove the remaining fibers.

The curing oven 15 may be sufficient merely to effect the setting of the adhesive by which the flock fibers are adhered to the substrate. On the other hand, and in accordance with one embodiment of the invention, the curing oven may be sufficient to perform the curing of the rubber or thermoplastic substrate as well as the setting of the adhesive.

*Operation*

The operation will be described in respect to the embodiment in which the flock is deposited on an uncured rubber substrate. It should be understood that the process steps are equally applicable to the flocking of a premolded curing substrate except that in the case of the cured substrate, the pass through the oven is required only for the purpose of setting the adhesive, whereas in the case of the uncured substrate, the pass through the oven is required to cure the rubber and to set the adhesive.

An uncured rubber sheet or substrate which has been cut to the proper size and peripheral configuration is mounted on a buck 20 at the loading station 11. At this station the buck is supported on the cradles 59 with its contoured plate 22 facing in an upward direction. In addition to having that contour which is required for the proper fitting of the mat to the automobile floor, the plate 22 may be provided with a coarse texture as shown in FIG. 8. After the substrate is laid on the buck, a vacuum hose is connected to the leading or trailing end of the tubular trunnion 43 and the space between the substrate and the contoured surface of the buck is evacuated. The atmospheric pressure forces the quite flexible uncured substrate to conform not only to the buck contours but also to conform generally to the coarse texture in the surface of the buck.

The buck is conveyed into the station 12 where an adhesive is applied to the exposed surface of the substrate. The buck is preferably maintained in a horizontal position with the substrate facing upwardly and an adhesive is applied by spraying downwardly onto the exposed surface of the substrate.

As the buck is conveyed to the adhesive applying station, it may be found to be useful to connect the next succeeding buck to the trailing end of the trunnion 43 as by means of a short length of insulative hose. By connecting two or more bucks in tandem, it is possible to minimize the complexity of the hose connections required to maintain the bucks continuously under vacuum.

After leaving the adhesive applying station, the hose 47 is disconnected from the leading end of the trunnion 43. The valve fitting 45 immediately seals the trunnion and maintains the evacuated condition between the buck and substrate thereby maintaining the substrate in proper position on the buck. A hose at the flocking station 13 is then connected to the leading end of the trunnion 43, that hose remaining attached until the buck has completed its traverse through the flocking station 13 and cleaning station 14. By providing the bucks with the valve fittings 45 and by providing hoses at both the operating and flocking stations, the need for extraordinarily long hoses is eliminated.

Prior to moving into the flocking station, the buck is rotated through 180° so that the substrate faces downwardly. At the flocking station, the flock feeders 100 sift a substantially uniform layer of flock fibers onto the continuously moving conveyor belt 84. The belt carries the flock under the hood structure 115 which generally defines the operative flocking area. As the buck 20 moves into the flocking area under the hood 115 and over the belt 84 it first engages the commutator shoes 71, the shoes riding in the V-shaped commutator rails 70. The proper contact of the shoes 71 with the commutator rails 70 is assured in part by flared entrances 77 to the commutator rails and by the engagement of the locator rods 61 on the trunnion 43 with the V-shaped surface 60 of the cradles 59 which maintains the buck in its horizontal attitude. The contact of the shoes 71 with the commutator rails 70 raises the potential of the whole buck to an operative voltage. The particular voltage selected will be dependent upon a number of factors particularly including the depth of the contours and the overall spacing of the buck about the belt 84. The potential on the buck creates an electrostatic field between the plate 83 over which the belt passes, the belt being maintained at ground potential.

The electrostatic field between the buck and the plate 83 creates lines of force between the plate 83 and the surface of the buck. The flock particles become charged, and move toward the buck following a path generally perpendicular to the surface of the buck and engage the adhesive on the substrate. Thus, the flock particles are driven into the surface of the substrate substantially perpendicularly to that surface portion to which they are adhered.

In a traverse of the belt 84 requiring approximately one minute, the surface of the substrate becomes completely covered with a uniform deposit of flock fibers.

A number of fibers which do not contact the adhesive remain on the flocking surface. As the buck moves out of the flocking apparatus, it carries the substrate over the oppositely charged grid or screen 120 which attracts a large portion if not all of the non-adhering flock fibers. These flock fibers are drawn into the vacuum head 121 below the screen from which they are pneumatically transported to the feeders 100. Thereafter, the flocked surface may be subjected to a very light vacuum cleaning to remove any remaining fibers.

After cleaning the substrate, the buck is rotated through 180° and the hose 47 is disconnected from the trunnion fitting 45. The valve fittings again close immediately to maintain the vacuum between the substrate and the buck. The maintenance of the vacuum is important in that embodiment of the invention in which the rubber or thermoplastic substrate is carried in the oven 15 in order to provide assurance of the maintenance of good texture definition during curing. In the absence of the vacuum, the uncured substrate might tend to relax and lose the definition of texture. In the embodiment wherein the substrate is previously molded and cured, the vacuum does not need to be maintained.

The buck is then conveyed into the curing oven where the substrate is cured and simultaneously the adhesive is set, thereby securely adhering the flock fibers to the substrate.

The curing conditions will, of course, depend upon the character of the substrate, these conditions differing in the case of rubber as contrasted to a particular thermoplastic substrate.

Following curing, the surface of the sheet is subjected to a final cleaning operation which can include mechanical vibration and vacuum cleaning to remove all free fibers. After cleaning, the vacuum is removed from the buck and the completed flocked sheet is removed.

We claim:
1. Apparatus for manufacturing sheets constituted by a rubber substrate having flock fibers deposited on its surface comprising a base,
a lower electrode mounted on said base,
means providing a supply of flock fibers over said electrode,
a conveyor passing over said electrode,
a conductive buck upon which the sheet is adapted to be laid,
means mounting said buck on said conveyor to pass said buck over said electrode with said sheet facing downwardly,
means connected to said buck for evacuating the space between said buck and said sheet,
a high voltage source connected between said electrode and said buck,
and a rubber curing oven in the path of said conveyor and downstream of said electrode.

2. Apparatus for flocking sheets comprising a base,
a lower electrode mounted on said base,
means providing a supply of flock fibers over said electrode,
a conveyor passing over said electrode,
a conductive buck upon which the sheet is adapted to be laid,
means mounting said buck on said conveyor to pass said buck over said electrode with said sheet facing downwardly,
means connected to said buck for evacuating the space between said buck and said sheet,
at least one commutator rail on said buck,
a conductive member engageable with said rail when said buck passes over said electrode,
and a high voltage source connected between said electrode and said buck.

3. Apparatus for flocking sheets comprising a base,
a lower electrode mounted on said base,
means providing a supply of flock fibers over said electrode,
a conveyor passing over said electrode,
a conductive support upon which the sheet is adapted to be laid,
means mounting said support on said conveyor to pass said support over said electrode with said sheet facing downwardly,
means connected to said support for evacuating the space between said support and said sheet,
and a high voltage source connected between said electrode and said support.

4. Apparatus for flocking sheets comprising a base,
a lower electrode mounted on said base,
means providing a supply of flock fibers over said electrode,
a conductive support upon which the sheet is adapted to be laid,
means mounting said support over said electrode with said sheet facing downwardly,
means connected to said support for evacuating the space between said support and said sheet,
and a high voltage source connected between said electrode and said support.

5. Apparatus for flocking sheets comprising a base,
a lower electrode mounted on said base,
means providing a supply of flock fibers over said electrode,
a conveyor passing over said electrode,
a conductive buck having a foraminous surface upon which the sheet is adapted to be laid,
a tubular trunnion fixed to the opposite surface of said buck,
conduit means connecting said trunnion to said buck,
means connecting said trunnion to said conveyor to pass said buck over said electrode with said sheet facing downwardly,
a vacuum pump and means connecting said vacuum pump to said trunnion for evacuating the space between said buck and said sheet,
and a high voltage source connected between said electrode and said buck.

6. Apparatus for flocking sheets comprising a base,
a lower electrode mounted on said base,
means providing a supply of flock fibers over said electrode,
a conveyor passing over said electrode,
a conductive buck having a foraminous surface upon which the sheet is adapted to be laid,
a tubular trunnion fixed to the opposite surface of said buck, said trunnion having at least one automatic closing valve fitting,
conduit means connecting said trunnion to said buck,
a vacuum pump and means connecting said vacuum pump to said fitting for evacuating the space between said buck and said sheet,
means connecting said trunnions to said conveyor to pass said buck over said electrode with said sheet facing downwardly,
and a high voltage source connected between said electrode and said buck.

7. Apparatus for flocking sheets comprising a base,
a lower electrode mounted on said base,
means providing a supply of flock fibers over said electrode,
a conveyor passing over said electrode,
said conveyor having a pair of V-shaped cradle surfaces,
a conductive buck having a foraminous surface upon which the sheet is adapted to be laid,
a longitudinally extending trunnion fixed to the opposite surface of said buck, said trunnion having free ends resting in said cradle,
at least one locator bar secured at each free end of said trunnion and lodged in the apex of said V-shaped surface when said foraminous surface faces downwardly, at least one longitudinally extending commutator rail on the opposite surface of said buck, a conductive rod suspended over said lower electrode in the path of said commutator rail and engageable with said rail as said buck passes over said electrode, and a high voltage source connnected between said electrode and said conductive rod.

8. Apparatus for flocking sheets comprising a base, a lower electrode mounted on said base, means providing a supply of flock fibers over said electrode, a conveyor passing over said electrode, said conveyor having a pair of V-shaped cradle surfaces, a conductive buck having a surface upon which the sheet is adapted to be laid, a longitudinally extending trunnion fixed to the opposite surface of said buck, said trunnion having free ends resting in said cradle, and at least two locator bars secured at each free end of said trunnion and adapted to lodge in the apex of said V-shaped surface when said buck is vertical and horizontal respectively.

References Cited

UNITED STATES PATENTS

| Re 23,910 | 12/1954 | Smith et al. | 18—19 XR |
|---|---|---|---|
| 2,222,539 | 11/1940 | Meston | 117—17 XR |
| 2,238,534 | 4/1941 | McDonald | 18—19 XR |
| 2,835,016 | 5/1958 | Dixon. | |
| 2,869,511 | 1/1959 | Dickey et al. | 117—17 |
| 2,909,718 | 9/1959 | Martelli et al | 18—19 |
| 2,974,369 | 3/1961 | Orthuber et al. | 264—24 |
| 3,081,698 | 3/1963 | Childress et al. | 117—17.5 XR |
| 3,190,945 | 6/1965 | Diamond | 18—19 XR |
| 3,234,600 | 2/1966 | Goldsworthy | 264—24 XR |
| 3,273,203 | 9/1966 | Ross | 18—19 |

WILLIAM J. STEPHENSON, *Primary Examiner.*